Dec. 11, 1951 — G. A. PETERSEN — 2,578,014
EARTH AUGER
Filed Aug. 5, 1946 — 2 SHEETS—SHEET 1
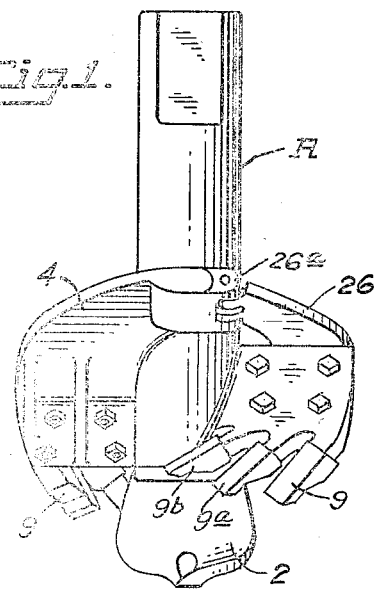
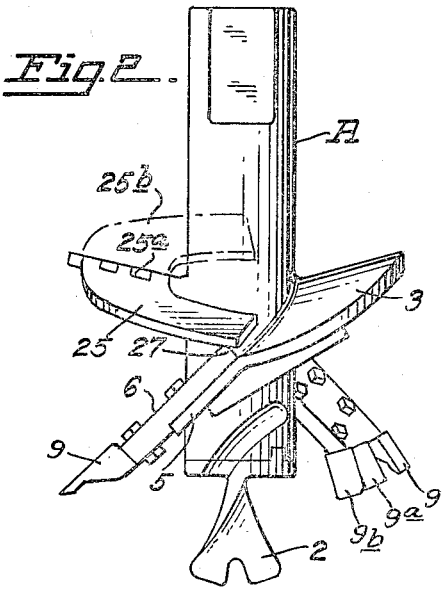
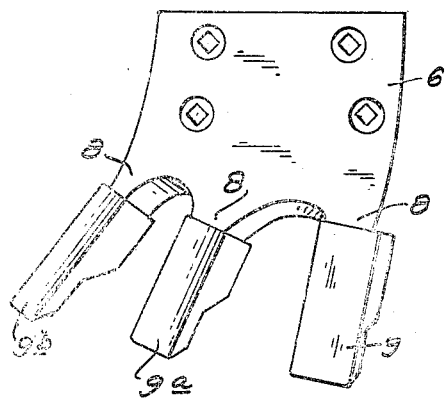
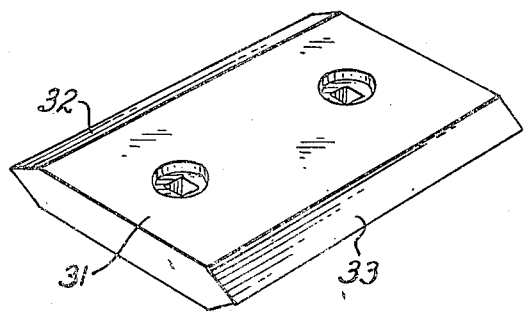
INVENTOR.
GERALD A. PETERSEN.
BY
Thomas Aastberg
ATTORNEY

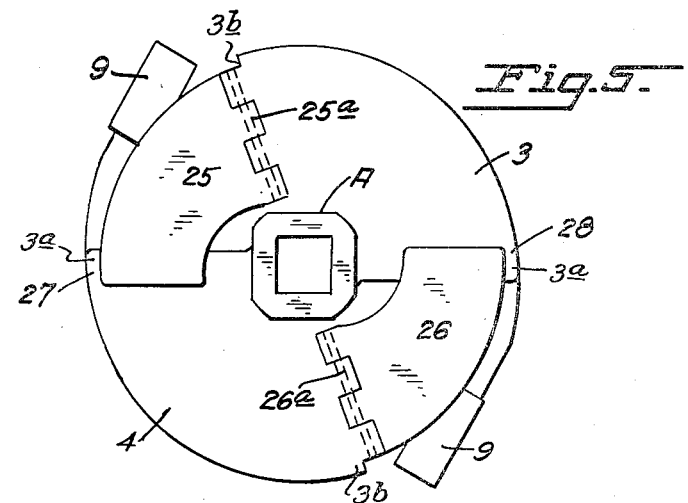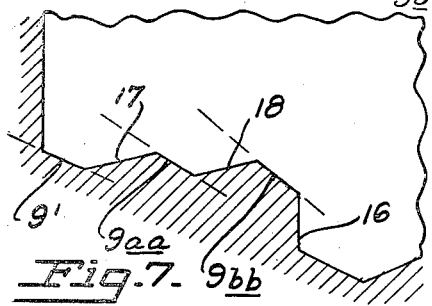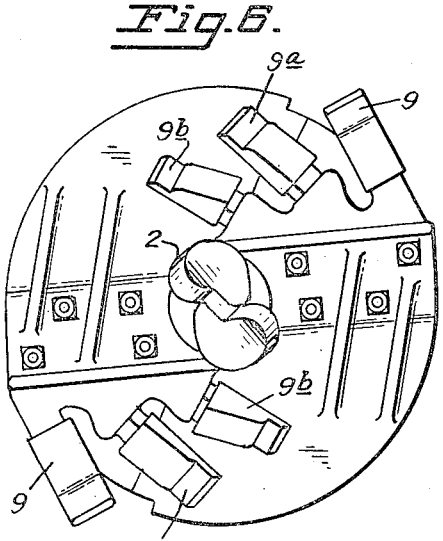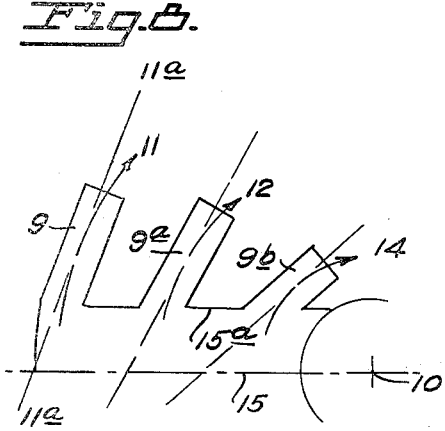

Patented Dec. 11, 1951

2,578,014

UNITED STATES PATENT OFFICE 2,578,014

EARTH AUGER

Gerald A. Petersen, San Francisco, Calif.

Application August 5, 1946, Serial No. 688,436

3 Claims. (Cl. 255—70)

This invention relates to power driven earth augers particularly intended for digging or boring holes for telephone and power line posts and the like.

The object of the present invention is generally to improve and simplify the construction and operation of earth augers of the character described; to provide an auger of the helical type and particularly a double helical type; to provide a double helical type auger which presents two opposed cutting edges; to provide removable and reversible cutting blades; to provide a cutting edge having a plurality of spaced apart chisel-like teeth so that a shearing cut is obtained both in a horizontal and in a vertical plane; to provide a double helical type auger with diametrically opposed cutting edges and between them a cooperating pilot bit; and further, to provide in conjunction with the double helix a pair of opposed hinged gates to trap and retain dirt when pulling or raising the auger out of the hole.

The earth auger is shown by way of illustration in the accompanying drawings in which:

Fig. 1 is a side elevation of the earth auger;

Fig. 2 is a side elevation, but taken at right angles to Fig. 1;

Fig. 3 is a perspective view of one form of cutting blade;

Fig. 4 shows another form of cutting blade;

Fig. 5 is a plan view of Fig. 1;

Fig. 6 is a bottom view of Fig. 1;

Fig. 7 is a diagrammatic view showing the manner in which the pilot bit and the cutter teeth cut while boring a hole; and Fig. 8 is a diagrammatic view showing the position of the cutter teeth.

Referring to the drawings in detail and particularly Figs. 1, 2 and 5 and 6, A indicates a central shaft or stem at the lower end of which is suitably secured a pilot bit 2. Welded to the stem or formed integral therewith are a pair of helical shaped blades 3 and 4. These blades are positioned diametrically opposite each other one on each side of the stem and form a double helix, the function of which will hereinafter be described.

The lower end of each helical shaped blade is bent downwardly to assume an angle slightly steeper or greater than that presented by the pitch of the blades. These bent ends form seats or supports 5 for cutter bars or blades of different types as shown in Figs. 3 and 4. The type shown in Fig. 3 consists of a plate 6 which is bolted or otherwise secured to the seat 5. The forward edge is formed to provide a plurality of spaced apart bars 8, each of which constitutes a support for a chisel-like cutter such as shown at 9, the cutters 9, 9a and 9b being suitably secured when applied for instance by welding. The position assumed by the chisel-like cutters is of great importance. By referring to Fig. 8, it will be noted that as the auger stem A rotates about its central axis 10, the path of rotation of the cutter 9 will be that indicated by the arc 11, the cutter 9a by the arc 12, and the cutter 9b by the arc 14. It will further be noted that each cutter is disposed with its long axis on an acute angle with relation to the radial line indicated at 15 and that these acute angles are not only tangent to the respective arcs 11, 12 and 14, but that these angles vary. The angle of the cutter 9 being indicated by the dotted line 11a—11a is the greatest. The angle of the cutter 9a is slightly less while the angle of the cutter 9b is the least. The cutters 9, 9a and 9b on each cutter blade travel approximately in a horizontal plane when the auger is in operation and as the cutters on each seat 5 are spaced apart, it is preferable to stagger the cutters slightly so that the cutters on one seat 5 will cut in paths disposed between the paths of the cutter on the other seat 5.

It should also be noted by referring to Figs. 6 and 7 that the edges of the cutters 9, 9a and 9b assume different angles with relation to a horizontal plane. That is (see Fig. 3), each bar 8 is slightly twisted about its longitudinal axis so that when the chisel cutters 9, 9a and 9b are applied, they will assume different angular positions with relation to a horizontal plane. Thus, when the auger is being rotated, the pilot bit will cut or bore the hole indicated at 13 in Fig. 7, while the cutters 9, 9a and 9b will cut angular surfaces such as indicated at 9', 9aa and 9bb. As the cutters on the other blade are staggered with relation to the cutters on the first named blade, the areas 17 and 18 between the cuts 9', 9aa and 9bb will be cut on similar angles by the cutters of the second named blade.

From the foregoing it should be apparent that the cutters are not only disposed on different angles in a horizontal plane with respect to a radius 15, but also on different angles measured vertically with relation to a horizontal plane with the result that the cutting edge of each cutter cuts with a slicing action in both planes thereby not only decreasing wear and tear, but also materially increasing cutting efficiency.

The chisel-like cutters are employed in hard and gravel-like formations. In softer formations such as earth, clay, etc., a straight-edged cutter blade 31 may be employed as shown in Fig. 4. This blade by the way is reversible as it is provided with two cutting edges 32 and 33, but whether one or another of the cutting blades is employed, it should be noted (see particularly Fig. 8) that the cutting edge is positioned forward of the radial line 15 drawn from the axis 10 of rotation. For instance, it is obvious that the forward end of the cutters 9, 9a and 9b are set forward of this radial line and if the blade shown in Fig. 4 is employed, the line indicated at 15a will represent the cutting edge and this is also obviously positioned forward of the radial line 15. This forward positioning of the cutters is also important as it increases the tendency of the cutters to form a slicing cut during rotation of the auger, hence further improving cutting efficiency and reducing wear and tear and requiring less power to operate.

In actual operation when the auger is in a hole and rotating, it is obvious that the cutters due to their inclined position, will dig into the material and force it upwardly on to the helical blades 3 and 4, and that these blades due to their helical shape will force the dirt or material upwardly into the hole or in other words into the annular space surrounding the stem A. When a certain amount of dirt or material accumulates above the auger, it is common practice to lift the auger to remove the dirt, and when doing this, it is found, particularly if the dirt is dry, hard and crumbly, that it tends to slide down the helical blades and back into the hole. To prevent this, a pair of gates 25 and 26 are provided. These gates are hingedly secured as at 25a and 26a to the upper ends of the helical blades and their free ends lift as shown in dotted lines at 25b (see Fig. 2) and thereby permit the dirt to work upwardly when the auger is digging, but they close the moment the auger is lifted as the free ends overlap and will rest at the points indicated at 27 and 28, thus trapping the dirt and permitting substantially complete removal thereof when the auger is lifted.

By referring to Fig. 5 it will be noted that the helical blade 3 extends from the point 3a to the point 3b a distance slightly more than ninety degrees of a revolution about the stem A. To be more exact the blade extends through an angle of from 110 to 125 degrees; the reason therefor is that it is desirable to leave as large an entrance opening to each helical blade as possible so that larger stones, rocks and chunks of material may pass through. For instance when digging in gravel formations fairly large stones, three or four or more inches in diameter, are often encountered and dislodged by the chisel-like cutters. These stones when dislodged are forced upwardly over the cutters and the plate 6 and when they engage the under side of the gates, they lift them and the stones will accordingly pass on to the helical blades which will impart a further lift in an upward direction into the hole. It is for the above reason that each helical blade should be maintained as short as possible as the length and the pitch of the helical blades determine the size of the entrance openings covered by the gates and thereby the size of stones or rocks that may be handled.

In actual operation an auger of this character has been found exceedingly efficient for digging in gravel and other hard formations, and when the blade shown in Fig. 4 is employed, clay and other similar sticky formations may be efficiently handled. As both the blades shown in Figs. 3 and 4 are removable or detachable, it is obvious that they may be removed or replaced from time to time by re-sharpened cutters, and so may, of course, the pilot bit, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. An auger of the character described comprising a central stem whereby rotation is imparted, a pair of helical shaped blades secured to the stem, one on each side thereof and opposite each other, said blades forming a double helix, and a plurality of chisel-like cutters secured to the lower end of each helical blade, there being cutting edges on said cutters, said cutters being spaced apart, being disposed generally to continue said helix and being twisted to dispose the cutting edges at angles to said helix, the cutters on one side of the auger being radially staggered with relation to the cutters on the opposite side.

2. An auger of the character described comprising a central stem, a pair of helical shaped blades secured to the stem, one on each side thereof and opposite each other, said blades forming a double helix, a pair of plates each having a plurality of bars thereon said bars having the general conformation of said helix, means for securing said plates to said blades with said bars substantially continuing said double helix, and cutters on said bars, the cutters and bars being twisted to dispose the cutters at angles to said helix and the cutters on one of said plates being radially staggered with respect to the cutters on the other of said plates.

3. An auger of the character described comprising a central stem having an axis, a pair of helical shaped blades secured to the stem, one on each side thereof and opposite each other, said blades forming a double helix, a pair of plates each having a plurality of substantially straight bars thereon, said bars on each of said plates having the general conformation of said helix and ending at different radial planes, means for securing said plates to said blades with said bars substantially continuing said double helix, and cutters on said bars, the cutters and bars on one of said plates being radially staggered with respect to the cutters and bars on the other of said plates, and each of said bars and cutters when seen in the direction of said axis being approximately tangent to its arc of travel about said axis.

GERALD A. PETERSEN.

REFERENCES CITED

The following references are of record in the file of this patent:

UNITED STATES PATENTS

| Number | Name | Date |
|---|---|---|
| 882,128 | Thomas | Mar. 17, 1908 |
| 1,809,351 | Oliver | June 9, 1931 |
| 1,997,887 | Prior | Apr. 16, 1935 |
| 2,109,613 | Cook | Mar. 1, 1938 |

FOREIGN PATENTS

| Number | Country | Date |
|---|---|---|
| 21,078 | Great Britain | Oct. 16, 1914 |
| 405,726 | Great Britain | Feb. 15, 1934 |